(12) United States Patent
Makita et al.

(10) Patent No.: US 11,938,951 B2
(45) Date of Patent: Mar. 26, 2024

(54) METHOD AND DEVICE FOR CONTROLLING VEHICLE MOTION DURING ACCELERATION IN THE LATERAL DIRECTION

(71) Applicant: Nissan Motor Co., Ltd., Yokohama (JP)

(72) Inventors: Mitsuhiro Makita, Kanagawa (JP); Atsushi Takamatsu, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/028,679

(22) PCT Filed: Sep. 28, 2020

(86) PCT No.: PCT/IB2020/000803
§ 371 (c)(1),
(2) Date: Mar. 27, 2023

(87) PCT Pub. No.: WO2022/064236
PCT Pub. Date: Mar. 31, 2022

(65) Prior Publication Data
US 2023/0382395 A1    Nov. 30, 2023

(51) Int. Cl.
*B60W 30/02*    (2012.01)
*B60W 30/045*    (2012.01)
(Continued)

(52) U.S. Cl.
CPC .......... *B60W 40/08* (2013.01); *B60W 30/025* (2013.01); *B60W 30/045* (2013.01);
(Continued)

(58) Field of Classification Search
CPC .......... B60W 40/08; B60W 30/18163; B60W 2050/0055; B60W 2050/0056;
(Continued)

(56) References Cited

U.S. PATENT DOCUMENTS

| | | | |
|---|---|---|---|
| 2011/0060505 A1* | 3/2011 | Suzuki | B60T 7/12 701/41 |
| 2012/0136506 A1* | 5/2012 | Takeuchi | B60W 40/10 701/1 |

(Continued)

FOREIGN PATENT DOCUMENTS

| | | |
|---|---|---|
| CN | 105593089 A | 5/2016 |
| CN | 110155168 A | 8/2019 |

(Continued)

*Primary Examiner* — Donald J Wallace
*Assistant Examiner* — Daniel M. Robert
(74) *Attorney, Agent, or Firm* — Young Basile Hanlon & MacFarlane, P.C.

(57) ABSTRACT

A vehicle motion control method controls a motion state of a vehicle during a vehicle transient motion in which an acceleration in a lateral direction is generated in the vehicle. The vehicle motion control method includes: setting a corrected longitudinal acceleration for correcting a basic longitudinal acceleration determined in accordance with a required driving force for traveling of the vehicle; and determining a target longitudinal acceleration from the basic longitudinal acceleration and the corrected longitudinal acceleration, and operating a traveling actuator of the vehicle based on the target longitudinal acceleration. A direction and a magnitude of the corrected longitudinal acceleration are determined from a viewpoint of suppressing a change in a posture of an occupant of the vehicle in a roll direction.

8 Claims, 9 Drawing Sheets

(51) Int. Cl.
  *B60W 30/18*    (2012.01)
  *B60W 40/08*    (2012.01)
  *B60W 50/00*    (2006.01)

(52) U.S. Cl.
  CPC ............. *B60W 30/18163* (2013.01); *B60W 2050/0055* (2013.01); *B60W 2050/0056* (2013.01); *B60W 2520/10* (2013.01); *B60W 2540/223* (2020.02); *B60W 2720/106* (2013.01); *B60W 2720/125* (2013.01)

(58) Field of Classification Search
  CPC ..... B60W 2540/223; B60W 2720/106; B60W 2520/10; B60W 2720/125; B60W 30/045; B60W 30/025; B60W 2520/14; B60W 2520/18
  See application file for complete search history.

(56) References Cited

U.S. PATENT DOCUMENTS

| | | |
|---|---|---|
| 2016/0229401 A1 | 8/2016 | Nagatsuka et al. |
| 2019/0004529 A1* | 1/2019 | Im ..................... B62D 15/0255 |
| 2019/0016344 A1* | 1/2019 | Ehmann ............... A61B 5/0205 |
| 2019/0193721 A1* | 6/2019 | Yamamuro ......... B60W 30/182 |
| 2019/0202458 A1 | 7/2019 | Konishi et al. |
| 2020/0047766 A1 | 2/2020 | Ko et al. |
| 2021/0197822 A1* | 7/2021 | Jhang ................ B60W 30/0953 |
| 2021/0362720 A1* | 11/2021 | Takahashi ............. B62D 6/003 |
| 2022/0135054 A1* | 5/2022 | Nakamura ............ A61B 5/18 701/1 |

FOREIGN PATENT DOCUMENTS

| | | |
|---|---|---|
| JP | 2012-210020 A | 10/2012 |
| JP | 2017-71370 A | 4/2017 |

* cited by examiner

EXAMPLE 1 ——————
EXAMPLE 2 ··············
COMPARATIVE — — —
EXAMPLE

METHOD AND DEVICE FOR CONTROLLING VEHICLE MOTION DURING ACCELERATION IN THE LATERAL DIRECTION

TECHNICAL FIELD

The present invention relates to a vehicle motion control method and a vehicle motion control device.

BACKGROUND

JP 2017-71370 A proposes an occupant posture control device for a vehicle that predicts an acceleration in a vehicle width direction (a lateral direction) based on a travel plan of a vehicle in an autonomous vehicle, and changes a support state of an occupant by a vehicle seat to stabilize a posture of the occupant. In particular, in the occupant posture control device for a vehicle, before an acceleration (a lateral acceleration) due to steering of the vehicle is generated as in a case of lane change, a movable portion (a seatback support portion, an armrest, and the like) of the vehicle seat is operated so as to support a body of the occupant in accordance with the acceleration.

SUMMARY

However, in JP 2017-71370 A, it is necessary to adopt a mechanical structure for realizing the movement of the vehicle seat, and there is a concern that a vehicle structure becomes complicated and manufacturing cost increases.

In view of such circumstances, an object of the present invention is to provide a vehicle motion control method and a vehicle motion control device that can suppress a change in a posture of an occupant with a simpler configuration during a transient motion in which a lateral acceleration is generated in a vehicle.

According to an aspect of the present invention, a vehicle motion control method for controlling a motion state of a vehicle during a vehicle transient motion in which an acceleration in a lateral direction is generated in the vehicle is provided. The vehicle motion control method includes: setting a corrected longitudinal acceleration for correcting a basic longitudinal acceleration determined in accordance with a required driving force for traveling of the vehicle; and determining a target longitudinal acceleration from the basic longitudinal acceleration and the corrected longitudinal acceleration, and operating a traveling actuator of the vehicle based on the target longitudinal acceleration. A direction and a magnitude of the corrected longitudinal acceleration are determined from a viewpoint of suppressing a change in a posture of an occupant of the vehicle in a roll direction.

DETAILED DESCRIPTION

Hereinafter, embodiments of the present invention will be described with reference to the drawings and the like. The term "lane change" in the present specification is a concept that includes the merging such as movement from a lane to a main lane at an entrance of an expressway, in addition to a normal lane change in which a vehicle moves from a lane in which the vehicle is currently traveling to an adjacent lane with the intention of turning left or right at an intersection for heading toward a predetermined destination, or moving to a lane close to an exit of the expressway.

The term "autonomous driving" in the present specification is a concept that includes both the operation control (autonomous driving levels 1 to 4) of a vehicle that assists a part of the driving operation by a driver of the vehicle and the operation control (autonomous driving level 5) of the vehicle without the operation by the driver.

Further, the term "longitudinal acceleration" in the present specification is a concept that includes a rate of decrease in speed (that is, deceleration) in addition to a rate of increase (normal acceleration) in speed (vehicle speed) in an advancing direction of a vehicle. In particular, a sign of the acceleration when the vehicle speed increases is plus, and a sign of the acceleration when the vehicle speed decreases is minus. Similarly, the term "lateral acceleration" is a concept that includes an acceleration generated along one direction (left or right with respect to the advancing direction of the vehicle) in a vehicle width direction and an acceleration generated along the other direction (right or left with respect to the advancing direction of the vehicle). In particular, in the embodiments to be described below, for convenience of description, a sign of the "lateral acceleration" is defined as positive when heading to the left with respect to the advancing direction of the vehicle, and as negative when heading to the right with respect to the advancing direction of the vehicle.

Configuration Common to Each Embodiment

Figure 1:
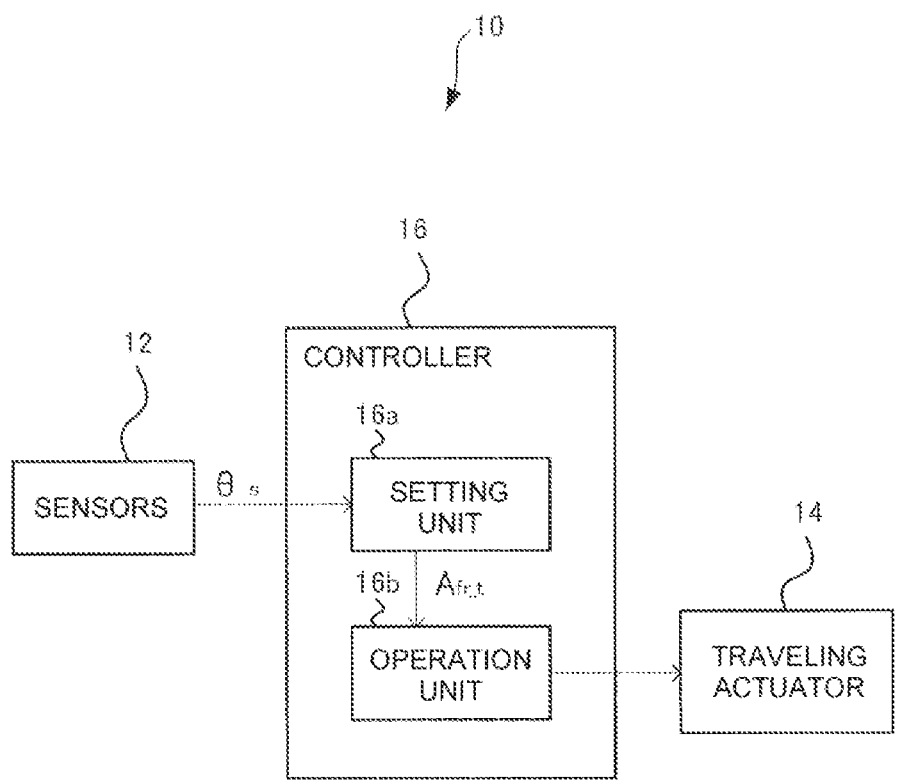
FIG. 1 is a diagram illustrating a configuration of a vehicle motion control device that executes a vehicle motion control method according to each embodiment of the present invention.

FIG. 1 is a block diagram illustrating a configuration of a vehicle motion control system 10 that executes a vehicle motion control method according to each embodiment. The vehicle motion control system 10 is mounted on a vehicle (hereinafter, referred to as a "vehicle α") to which the vehicle motion control method of the present embodiment is to be executed.

As illustrated, the vehicle motion control system 10 includes sensors 12, a traveling actuator 14, and a controller 16 as a vehicle motion control device.

The sensors 12 include various detectors (an in-vehicle camera, a radar, LIDAR, and the like) that detect a surrounding situation of the vehicle α, and various detection devices (an accelerator pedal sensor, a vehicle speed sensor, an acceleration sensor, a steering angle sensor, a yaw rate sensor, and the like) that detect internal information corresponding to a traveling state of the vehicle α. The sensors 12 output the detected surrounding information to the controller 16. In particular, in the present embodiment, the steering angle sensor, which is a part of the sensors 12, detects a steering angle $\theta_s$ of the vehicle α and outputs the steering angle $\theta_s$ to the controller 16.

The vehicle motion control system 10 may include a communication unit for accessing a system outside the vehicle α, from the viewpoint of allowing the controller 16 to acquire other necessary external information (GPS information or the like).

The traveling actuator 14 is a device that performs an operation based on a command from the controller 16 so that the vehicle α is in a desired motion state. The traveling actuator 14 mainly includes a driving system actuator that adjusts an acceleration in the longitudinal direction of the vehicle α and a steering system actuator that performs a turning operation of the vehicle α.

For example, when the vehicle α is equipped with an engine as a travel driving source, the driving system actuator includes a throttle valve that adjusts the amount (a throttle opening degree) of air supplied to the engine, a friction brake that adjusts a braking force applied to wheels of the vehicle α, and the like.

In addition, when the vehicle α is equipped with a motor as a travel driving source (when the vehicle α is a hybrid vehicle or an electric vehicle), the driving system actuator includes a power adjustment device (an inverter, a converter, or the like) that adjusts power supplied to the motor. In this case, a deceleration function of the driving system actuator may be implemented by a regenerative operation (a regenerative brake) of the motor operated by the power adjustment device, instead of or in conjunction with the friction brake.

On the other hand, the steering system actuator includes an assist motor or the like that controls a steering torque in an electric power steering system.

The controller 16 is implemented by a computer including a central processing unit (CPU), a read-only memory (ROM), a random access memory (RAM), and an input/output interface (an I/O interface). The controller 16 is programmed such that each processing in a vehicle motion control method to be described later can be executed.

In particular, the controller 16 includes a setting unit 16a and an operation unit 16b that are implemented by the above various hardware configurations and programs.

The setting unit 16a generates a storage area that stores a predetermined corrected longitudinal acceleration $A_{fr\_c}$ to be described later, and generates a command signal to be output to the operation unit 16b by referring to the storage area using the steering angle θs from the sensors 12 and other necessary information as inputs. In particular, the storage area of the setting unit 16a stores the corrected longitudinal acceleration $A_{fr\_c}$ that is set during a transient motion (particularly, a lane change) in which an acceleration in a lateral direction acts on the vehicle α by a turning operation based on a steering operation.

More specifically, the setting unit 16a calculates a basic longitudinal acceleration $A_{fr\_tb}$ according to an operation amount for an accelerator pedal during the lane change or a required driving force based on a command from Advanced Driver Assistance Systems (ADAS). Here, the basic longitudinal acceleration $A_{fr\_tb}$ corresponds to a target value (a target value according to the required driving force) of the acceleration for realizing a translational motion intended for the vehicle α according to a traveling scene. Further, the setting unit 16a calculates the corrected longitudinal acceleration $A_{fr\_c}$ using the steering angle $\partial 4s$ as an input. Here, the corrected longitudinal acceleration $A_{fr\_c}$ is a correction value of an acceleration determined from the viewpoint of suppressing a change in a posture of an occupant O during traveling of the vehicle α. Details of the setting of the corrected longitudinal acceleration $A_{fr\_c}$ will be described later. The setting unit 16a calculates a final target longitudinal acceleration $A_{fr\_t}$ by adding the corrected longitudinal acceleration $A_{fr\_tc}$ to the basic longitudinal acceleration $A_{fr\_tb}$, and outputs the final target longitudinal acceleration $A_{fr\_t}$ to the operation unit 16b.

The operation unit 16b calculates an operation amount of the traveling actuator 14 so that an actual longitudinal acceleration of the vehicle α approaches the final target longitudinal acceleration $A_{fr\_t}$, and operates the traveling actuator 14 based on the operation amount. More specifically, the operation unit 16b operates the throttle opening degree, a motor output, or the friction brake to satisfy the final target longitudinal acceleration $A_{fr\_t}$. In particular, in a case where the vehicle α is an electric vehicle, the operation unit 16b operates the power adjustment device so as to apply a positive torque to the motor when a magnitude of the final target longitudinal acceleration $A_{fr\_t}$ is increased (when the vehicle α is accelerated). Further, when the magnitude of the final target longitudinal acceleration $A_{fr\_t}$ is reduced (when the vehicle α is decelerated), the operation unit 16b operates the power adjustment device to apply a negative torque to the motor, increases the braking force of the friction brake, or executes both of these operations.

A function of the controller 16 can be implemented by any computer mounted on the vehicle α, such as an advanced driver assistance system (ADAS) controller, a motor controller, an engine control unit (ECU), or a vehicle controller. In addition, the controller 16 may be a single device, or may be divided into a plurality of devices so that each processing may be distributed and processed by the plurality of devices.

Figure 2:
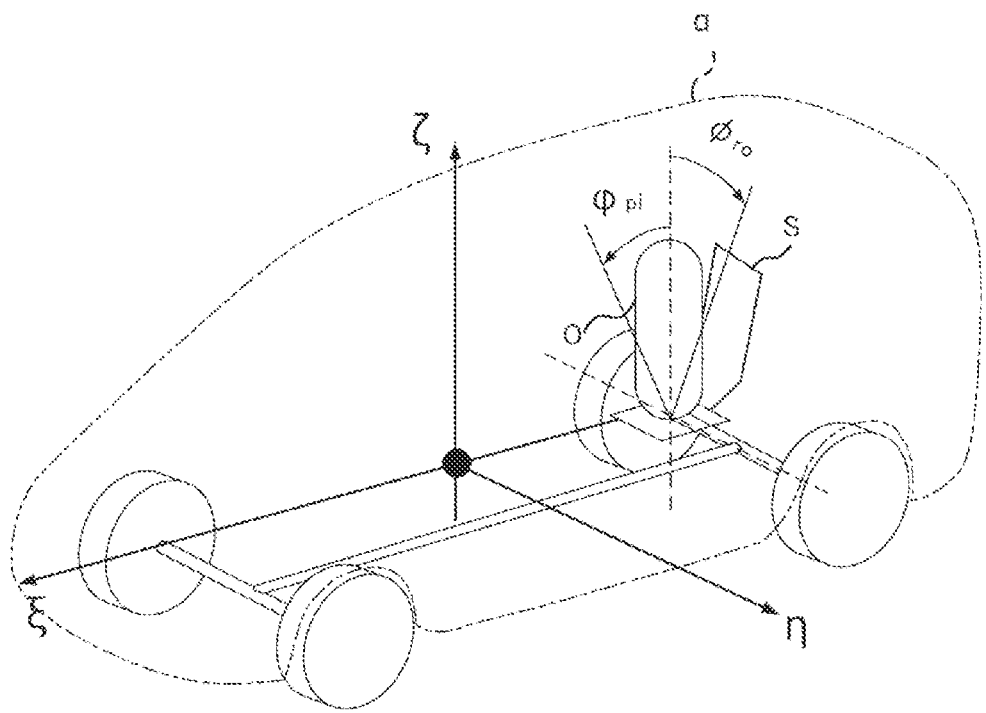
FIG. 2 is a diagram illustrating directions set in a vehicle.

Hereinafter, a vehicle motion control method of each embodiment will be described in detail on the premise of the above configuration. For reference, directions and angles of the vehicle α used in the present specification are defined as shown in FIG. 2. More specifically, the "vertical direction" corresponds to a ζ axis direction, the "longitudinal direction" corresponds to a ξ axis direction, and the "lateral direction" corresponds to a η lateral direction. Further, an angle in which a direction from the axis ζ toward the η axis is positive in a ζ-η plane with a trunk of the occupant O as an axis is referred to as a "roll attitude angle $\varphi_{ro}$". Further, an angle in which a direction from the ζ axis to the ξ axis in a ζ-ξ plane with the trunk of the occupant O as an axis is positive is referred to as a "pitch attitude angle $\varphi_{pi}$".

First Embodiment

Hereinafter, a vehicle motion control method according to the first embodiment will be described.

Figure 3:
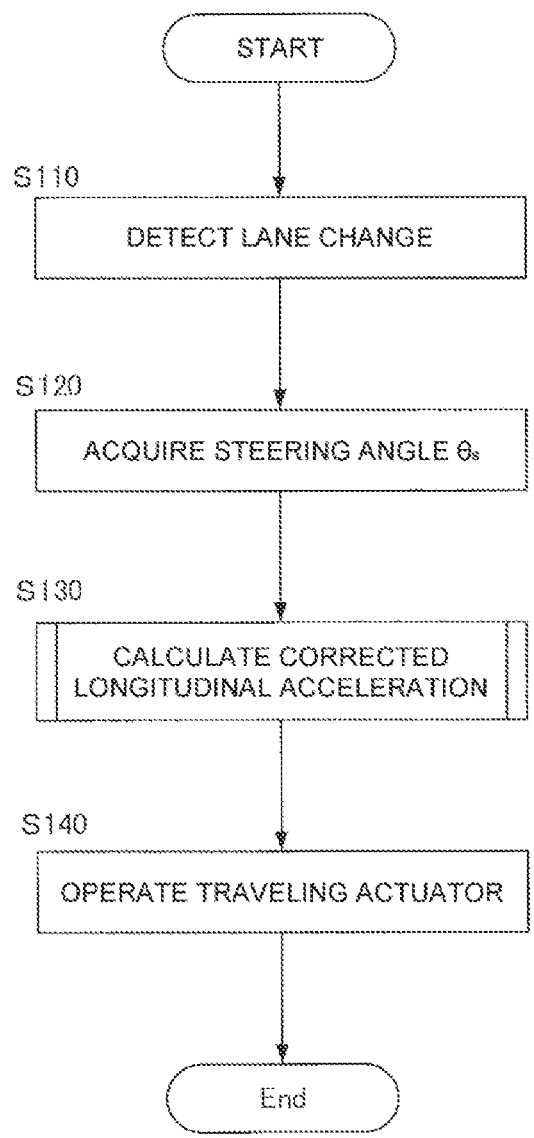
FIG. 3 is a flowchart illustrating a vehicle motion control method.

FIG. 3 is a flowchart illustrating a vehicle motion control method according to the present embodiment. The controller 16 repeatedly executes processing described below at predetermined control intervals.

First, in step S110, the controller 16 detects a lane change request for the vehicle α. Specifically, the controller 16 processes, as detection of the lane change request, detection of an operation performed on a direction indicator by the occupant O (particularly, a driver) or reception of a lane change command from an ADAS controller that executes automatic driving control. When the controller 16 is an ADAS controller, a start timing of the lane change determined by the controller 16 itself may be processed as the detection of the lane change request.

In step S120, the controller 16 acquires a steering angle $\theta_s$ from the sensors 12. In the present embodiment, the steering angle $\theta_s$ is used as an index of a progress degree of the lane change.

Figure 4:
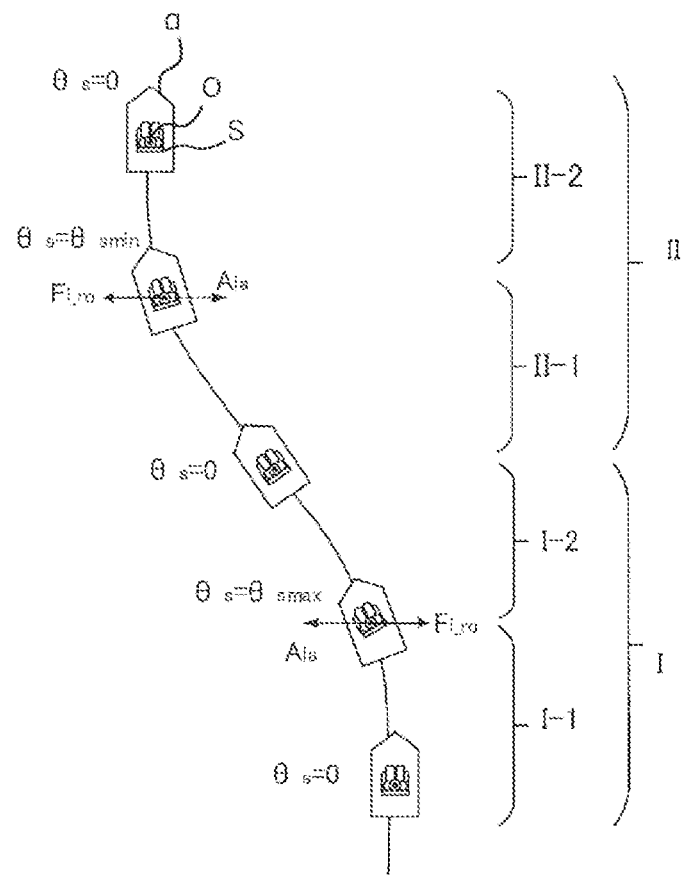
FIG. 4 is a diagram illustrating a relationship between a motion of a vehicle and an inertial force acting on an occupant.
Figure 4:
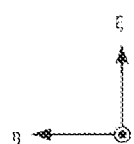

FIG. 4 is a diagram illustrating a relationship between the steering angle $\theta_s$ and the progress degree of the lane change. Hereinafter, for convenience of description, a direction in which the vehicle α turns to the left is defined as a positive direction of the steering angle $\theta_s$.

As illustrated, the lane change is divided into a first half movement phase I and a second half return phase II according to a state of a transient motion of the vehicle α. The movement phase I and the return phase II are further divided into two types of transient motions in which an absolute value of the steering angle $\theta_s$ increases or decreases.

More specifically, in the movement phase I, a turning force in the positive direction is applied (the steering angle $\theta_s$ is positive) in order to move the vehicle α from a current traveling lane to an adjacent lane of a lane change destination. That is, the movement phase I is a transient motion section in which a leftward lateral acceleration $A_{1a}$ in the figure acts on the vehicle α. Further, the movement phase I is divided into a first movement phase I-1 in which the steering angle $\theta_s$ increases from 0 to a maximum steering angle $\theta_{smax}$ and a second movement phase I-2 in which the steering angle $\theta_s$ decreases from the maximum steering angle $\theta_{smax}$ to 0 again. That is, the first movement phase I-1 is a transient motion section in which the absolute value of the lateral acceleration $A_{1a}$ (the absolute value of the steering angle $\theta_s$) increases. The second movement phase I-2 is a transient motion section in which the absolute value of the lateral acceleration $A_{1a}$ (the absolute value of the steering angle $\theta_s$) decreases.

In the return phase II, a turning force in a negative direction is applied (the steering angle $\theta_s$ is negative) in order to return a direction of the vehicle α in the adjacent lane of the change destination. That is, the return phase II is a transient motion section in which a rightward lateral acceleration $A_{1a}$ in the figure, which is opposite to the lateral acceleration $A_{1a}$ in the movement phase I, acts on the vehicle α. Further, the return phase II is divided into a first return phase II-1 in which the second movement phase I-2 is completed and the steering angle $\theta_s$ decreases from the state of 0 to a minimum steering angle $\theta_{smin}$ (<0), and a second return phase II-2 in which the steering angle $\theta_s$ increases from the minimum steering angle $\theta_{smin}$ to 0 again. That is, the first return phase II-1 is a transient motion section in which the absolute value of the lateral acceleration $A_{1a}$ (the absolute value of the steering angle $\theta_s$) increases. The second return phase II-2 is a transient motion section in which the absolute value of the lateral acceleration $A_{1a}$ (the absolute value of the steering angle $\theta_s$) decreases.

Therefore, in each phase constituting the lane change, the direction (the steering angle $\theta_s$) of the lateral acceleration $A_{1a}$ acting on the vehicle α changes in different patterns, and thus the current progress degree of the lane change can be grasped by referring to the steering angle $\theta_s$.

Returning to FIG. 3, in step S130, the controller 16 calculates the corrected longitudinal acceleration $A_{fr\_tc}$. Specifically, based on the steering angle $\theta_s$ acquired in step S120, the controller 16 refers to the corrected longitudinal acceleration $A_{fr\_tc}$ stored in the storage area, and calculates the corrected longitudinal acceleration $A_{fr\_tc}$ according to a current motion state of the vehicle α.

In step S140, the controller 16 adds the basic longitudinal acceleration $A_{fr\_tb}$ to the calculated corrected longitudinal acceleration $A_{fr\_tc}$ to determine the final target longitudinal acceleration $A_{fr\_t}$, and operates the traveling actuator 14 so that the actual longitudinal acceleration of the vehicle α approaches the final target longitudinal acceleration $A_{fr\_t}$.

Next, regarding the vehicle motion control method of the present embodiment, a background problem and a mechanism for solving the background problem will be described.

As can be understood with reference to FIG. 4, during the lane change, the lateral accelerations $A_{1a}$ in which the directions are different from each other are generated in the movement phase I and the return phase II, and thus an inertial force in a roll direction (hereinafter, also referred to as a "roll direction inertial force $F_{i\_ro}$") acts on the occupant O. Therefore, the posture of the occupant O is likely to change during the lane change. Such a change in the posture of the occupant O causes motion sickness.

More specifically, there is a theory (Motion Conflict Theory) that the motion sickness is caused by a mismatch between a motion sensed by a motion sensory organ and a motion recognition by sight or the like due to a motion of the body and the head of the occupant O. In particular, according to the motion conflict theory, it is considered that the mismatch is accumulated over time, and thus, when the mismatch exceeds a certain level, the symptom of motion sickness is more likely to occur.

When this is applied to the above lane change scene, the head of the occupant O is swung in the roll direction with respect to the trunk when the roll direction inertial force $F_{i\_ro}$ acts on the occupant O. As a result, it is assumed that the occupant O continuously feels a mismatch between the motion sensed by the motion sensory organ (a swing motion of the head in the roll direction) and the motion recognition by sight (a motion of a scenery outside the vehicle α as viewed from the occupant O), and it is considered that the motion sickness is likely to be induced.

In view of this point, in the present embodiment, the corrected longitudinal acceleration $A_{fr\_tc}$ is set from the viewpoint of suppressing the change in the posture of the occupant O in the roll direction in the scene of the lane change.

Figure 5A:
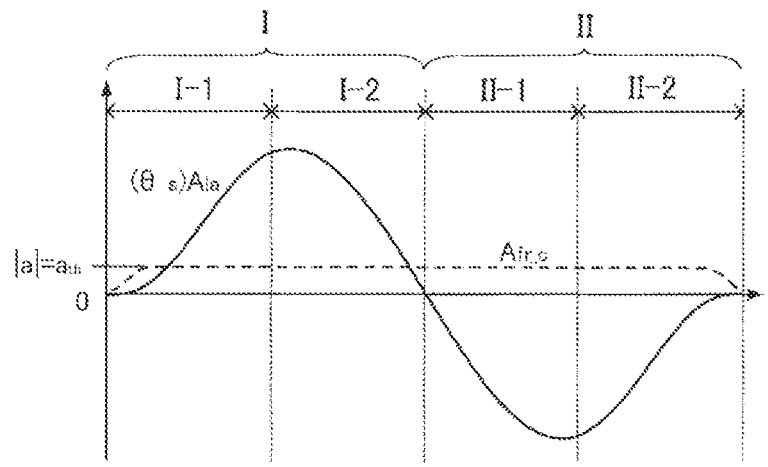
FIG. 5A is a diagram illustrating a corrected longitudinal acceleration set in a first embodiment.

FIG. 5A is a diagram illustrating the corrected longitudinal acceleration $A_{fr\_tc}$ set in the present embodiment. As illustrated, in the present embodiment, a direction of the corrected longitudinal acceleration $A_{fr\_tc}$ is set to a positive direction along the advancing direction of the vehicle α in all phases during the lane change. In addition, a magnitude of the corrected longitudinal acceleration $A_{fr\_c}$ (hereinafter, also referred to as a "set acceleration value |a|") is set to a minute constant value of about a sensory threshold ad, during riding in all phases during the lane change.

The sensory threshold ad, during riding in the present specification means a lower limit value of a magnitude of an acceleration at which the occupant O riding in the vehicle α can recognize that the vehicle α is in an accelerated or decelerated state in a translation direction (particularly, the longitudinal direction). Therefore, when the set acceleration value |a| is set to about the sensory threshold $a_{th}$ during riding, it is possible to prevent the occupant O from recognizing an acceleration change corresponding to the corrected longitudinal acceleration $A_{fr\_tc}$ with respect to the basic longitudinal acceleration $A_{fr\_tb}$.

Here, generally, it is known that a lower limit value (hereinafter, also referred to as a "standard sensory threshold") of the acceleration that can be recognized by a person in the longitudinal direction of the body is in a range of about 0.05 to about 0.1 [m/s²] in a static environment at a laboratory level (in an environment in which an external force such as vibration does not act). This fact is described in, for example, "Predicting direction detection thresholds for arbitrary translational acceleration profiles in the horizontal plane" (Written by Florian Soyka, Paolo Robuffo Giordano, Karl Beykirch, Heinrich H. Bulthoff, 2010, Experimental Brain Research).

In addition, as a result of diligent research, the present inventors have found that a lower limit value (hereinafter, also referred to as the "sensory threshold $a_{th}$ during riding") of the magnitude of the acceleration recognizable by the occupant O is larger than the standard sensory threshold when the vehicle is exposed to external factors such as vibration in a vehicle traveling environment. More specifically, the present inventors have experimentally found that the sensory threshold $a_{th}$ during riding is improved to several times or more (particularly about 2 to 3 times) the standard sensory threshold. Therefore, in the present embodiment, the sensory threshold $a_{th}$ during riding is set to a range of approximately 0.2 to 0.3 [m/s²].

In particular, the sensory threshold $a_{th}$ during riding is preferably selected from a range of a certain value or more (for example, 0.25 [m/s²] or more) in the above numerical range, from the viewpoint of enhancing an effect of suppressing a change in the roll attitude angle $\varphi_{ro}$ (a change in a posture of the occupant O) as much as possible in a range in which the occupant O does not recognize acceleration or deceleration.

Figure 5B:
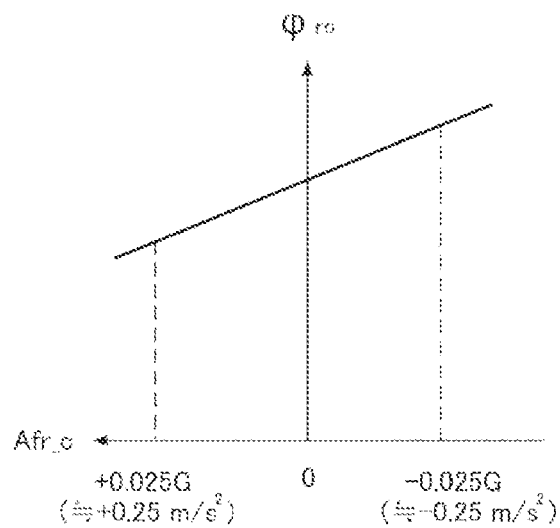
FIG. 5B is a diagram illustrating an effect of the corrected longitudinal acceleration set in the first embodiment.

FIG. 5B is a diagram illustrating an effect obtained when the corrected longitudinal acceleration $A_{fr\_c}$ of the present embodiment is set. In particular, FIG. 5B shows a graph in which a horizontal axis represents the corrected longitudinal acceleration $A_{fr\_c}$ and a vertical axis represents a maximum amplitude of the roll attitude angle $\varphi_{ro}$ which is an index of the change in the posture of the occupant O.

As understood from FIG. 5B, when the direction of the corrected longitudinal acceleration $A_{fr\_c}$ is set to a positive direction (when the vehicle α is accelerated), the roll attitude angle $\varphi_{ro}$ is smaller than in the case where the corrected longitudinal acceleration $A_{fr\_c}$ is not set or the direction thereof is set to a negative direction (in the case of $A_{fr\_c} \leq 0$). This is considered to be due to the fact that, by applying the acceleration in the advancing direction, an inertial force in a direction in which the occupant O is pressed against a seat surface of a seat S acts on the occupant O, the friction between the trunk of the occupant O and the seat surface of the seat S increases, and the posture of the occupant O is difficult to change. Therefore, by setting the direction of the corrected longitudinal acceleration $A_{fr\_c}$ to the positive direction in some or all sections during the lane change, it is possible to reduce a change in the roll attitude angle $\varphi_{ro}$.

According to the above theory, basically, it is considered that as the magnitude of the corrected longitudinal acceleration $A_{fr\_c}$ increases in the positive direction, the change in the roll attitude angle $\varphi_{ro}$ becomes smaller. However, when the corrected longitudinal acceleration $A_{fr\_c}$ of a certain magnitude or more (particularly, a corrected longitudinal acceleration $A_{fr\_c}$ of a magnitude greatly exceeding the above sensory threshold $a_{th}$ during riding) is given, the present inventors have also focused on a point that the occupant O may feel a sense of discomfort by recognizing the corrected longitudinal acceleration $A_{fr\_c}$ as the actual acceleration or deceleration of the vehicle α, and a point that a motion state (a vehicle speed based on the basic longitudinal acceleration $A_{fr\_tb}$) according to an original traveling purpose of the vehicle α may be affected.

Therefore, from the viewpoint of more reliably avoiding the sense of discomfort given to the occupant O and the influence on the motion state according to the traveling purpose of the vehicle α, in the present embodiment, the set acceleration value |a| is set to a minute value of about the above sensory threshold $a_{th}$ during riding. Accordingly, in addition to realizing the function of suppressing the change in the posture of the occupant O, it is possible to further reduce the influence on the motion state according to the traveling purpose of the vehicle α while suppressing a situation in which the occupant O feels a sense of discomfort by preventing the occupant O recognizing the corrected longitudinal acceleration $A_{fr\_c}$ as the actual acceleration or deceleration of the vehicle α.

During the above lane change, since the basic longitudinal acceleration $A_{fr\_tb}$ is set for the vehicle α in accordance with the original traveling purpose, the inertial force in the longitudinal direction (a pitch direction) of the vehicle corresponding to the basic longitudinal acceleration $A_{fr\_tb}$ acts on the occupant O. In particular, when the basic longitudinal acceleration $A_{fr\_tb}$ is large, the head of the occupant O is swung accordingly (the change in the pitch attitude angle $\varphi_{pi}$ becomes large). In contrast, according to the vehicle motion control method of the present embodiment, the action of pressing the occupant O against the seat S is generated by the action of the corrected longitudinal acceleration $A_{fr\_c}$ set in the positive direction, and thus it is possible to suppress the change in the pitch attitude angle $\varphi_{pi}$ similarly to the change in the roll attitude angle $\varphi_{ro}$. That is, it is possible to reduce the change in the posture of the occupant O in both the roll direction and the pitch direction.

According to the present embodiment having the configuration described above, the following operation and effect are exerted.

In the present embodiment, there is provided a vehicle motion control method for controlling a motion state of the vehicle α during a vehicle transient motion (during a lane change) in which the acceleration in the lateral direction (the lateral acceleration $A_{1a}$) is generated in the vehicle α (step S110). In the vehicle motion control method, a corrected longitudinal acceleration $A_{fr\_c}$ for correcting a basic longitudinal acceleration $A_{fr\_tb}$ determined in accordance with a required driving force for traveling of the vehicle α is set (step S130), a target longitudinal acceleration (a final target longitudinal acceleration $A_{fr\_t}$) is determined from the basic longitudinal acceleration $A_{fr\_tb}$ and the corrected longitudinal acceleration $A_{fr\_tc}$, and the traveling actuator 14 of the vehicle α is operated based on the final target longitudinal acceleration $A_{fr\_tc}$ (step S140). The direction and the magnitude of the corrected longitudinal acceleration $A_{fr\_c}$ are determined from the viewpoint of suppressing the change (the roll attitude angle $\varphi_{ro}$) in the posture of the occupant O of the vehicle α in the roll direction.

Accordingly, during the vehicle transient motion in which the lateral acceleration $A_{1a}$ acts on the vehicle α, the change in the posture of the occupant O in the roll direction can be suppressed by a simple method of adjusting the direction and the magnitude of the acceleration of the vehicle α in the longitudinal direction with respect to the basic longitudinal acceleration $A_{fr\_tb}$ according to an original motion purpose. That is, it is possible to stabilize the posture of the occupant O during the vehicle transient motion without using a complicated mechanical structure or the like for making the seat S movable.

In the present embodiment, the direction of the corrected longitudinal acceleration $A_{fr\_tc}$ is set to the positive direction (that is, an acceleration direction) along the advancing direction of the vehicle α.

Accordingly, the inertial force can be applied to the occupant O so as to increase a frictional force between the trunk of the occupant O and the seat surface of the seat S, and thus the effect of suppressing the change in the posture of the occupant O is further improved.

In particular, in the present embodiment, the magnitude of the corrected longitudinal acceleration $A_{fr\_tc}$ is set to the sensory threshold $a_{th}$ during riding obtained by correcting a sensory threshold (a standard sensory threshold) with respect to a translational acceleration of a person based on the traveling environment of the vehicle α or a value close thereto.

Accordingly, the magnitude of the corrected longitudinal acceleration $A_{fr\_tc}$ (the set acceleration value |a|) can be set sufficiently smaller than the magnitude of the basic longitudinal acceleration $A_{f\_tb}$ within a range in which the occupant O does not recognize a sense of acceleration or deceleration during the vehicle transient motion. Therefore, it is possible to suppress the occupant O from recognizing acceleration and deceleration while exhibiting the effect of suppressing the change in the posture of the occupant O in the roll direction, and it is possible to set the corrected longitudinal acceleration $A_{fr\_tc}$ so as not to significantly deviate from the original traveling purpose of the vehicle α.

Further, according to the present embodiment, the controller 16 is provided as a vehicle motion control device for executing the vehicle motion control method. The controller 16 controls a motion state of the vehicle α during the vehicle transient motion in which the acceleration in the lateral direction (the lateral acceleration $A_{1a}$) is generated in the vehicle α.

The controller 16 includes the setting unit 16a that sets a corrected longitudinal acceleration $A_{fr\_c}$ for correcting a basic longitudinal acceleration $A_{fr\_tb}$ determined in accordance with a required driving force for traveling of the vehicle α, and the operation unit 16b that determines a target longitudinal acceleration (a final target longitudinal acceleration $A_{fr\_t}$) from the basic longitudinal acceleration $A_{fr\_tb}$ and the corrected longitudinal acceleration $A_{fr\_tc}$, and operates the traveling actuator 14 of the vehicle α based on the final target longitudinal acceleration $A_{fr\_tc}$.

Accordingly, a suitable control configuration for executing the vehicle motion control method is implemented.

Second Embodiment

Hereinafter, the second embodiment will be described. The same elements as those in the first embodiment are denoted by the same reference numerals, and the description thereof will be omitted. The present embodiment is different from the first embodiment in the content of processing (setting of the corrected longitudinal acceleration $A_{fr\_c}$) in step S130 of FIG. 3.

Figure 6:
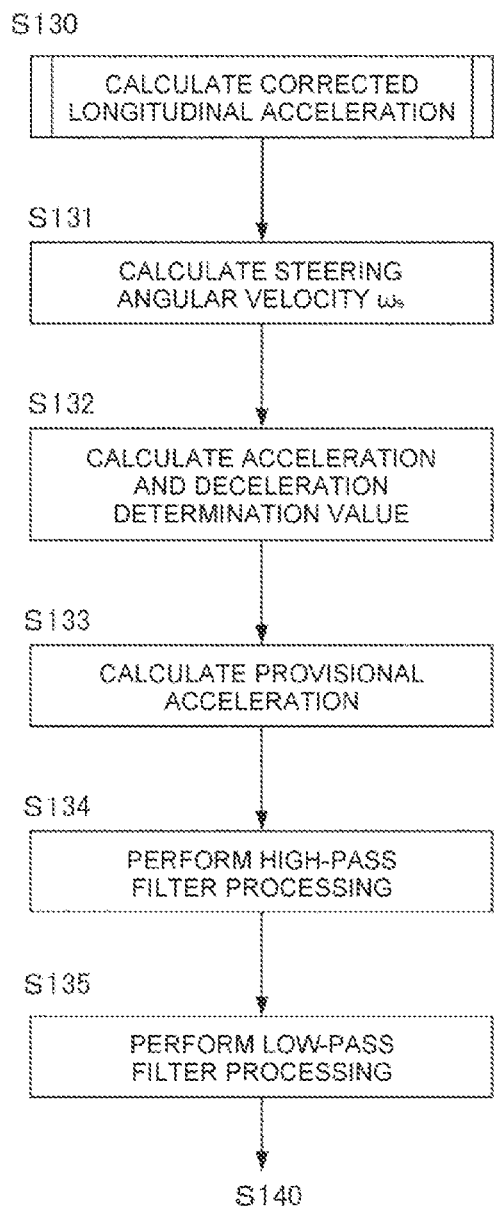
FIG. 6 is a diagram illustrating setting of a corrected longitudinal acceleration in a second embodiment.
Figure 7A:
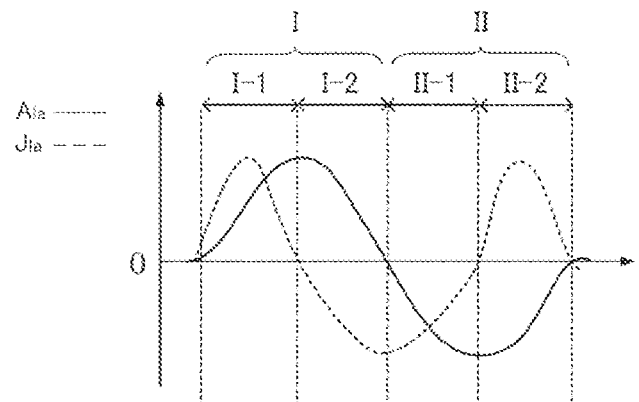
FIGS. 7A-D are diagrams illustrating a control result by a vehicle motion control method according to the second embodiment.
Figure 7B:
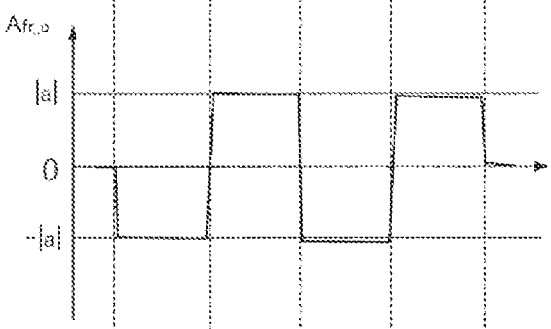
Figure 7C:
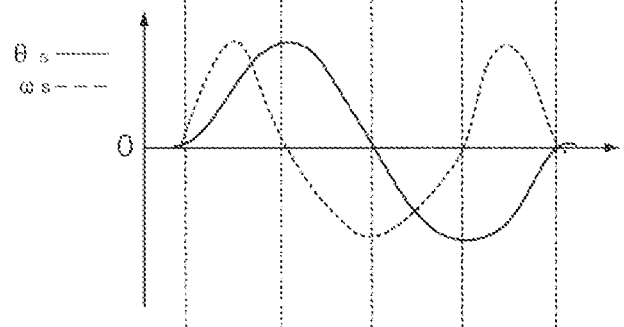
Figure 7D:
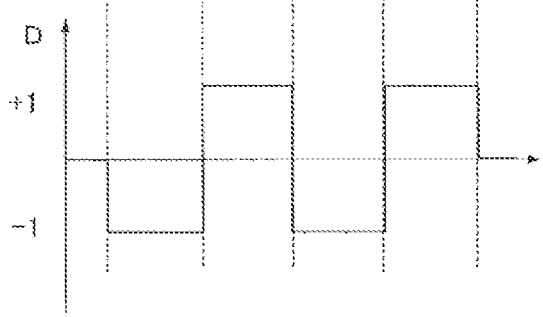

FIG. 6 is a flowchart illustrating the setting of the corrected longitudinal acceleration $A_{fr\_c}$ in the present embodiment. The processing of the flowchart is started following the acquisition of the steering angle $\theta_s$ in step S120 described in FIG. 3.

First, in step S131, the controller 16 calculates a steering angular velocity $\omega_s$. Specifically, the controller 16 calculates the steering angular velocity $\omega_s$ by differentiating the steering angle $\theta_s$ with respect to time. Alternatively, the controller 16 may receive the steering angular velocity $\omega_s$ calculated by the sensors 12 (particularly, a steering angle sensor standardly installed in an electronically controlled steering system).

In particular, in the present embodiment, the steering angular velocity $\omega_s$ can be used as an index of a progress degree of a lane change together with the steering angle $\theta_s$. More specifically, the steering angular velocity $\omega_s$ during the lane change can be regarded as an indication of a time rate of change of the lateral acceleration $A_{1a}$ (hereinafter, also referred to as a "lateral jerk $J_{1a}$"). Therefore, by referring to both the steering angle $\theta_s$ and the steering angular velocity $\omega_s$, it is possible to detect whether the current progress degree of the lane change of the vehicle α is in the movement phase I or the return phase II (whether the steering angle $\theta_s$ is positive or negative), detect whether the current progress degree is in the first movement phase I-1 or the second movement phase I-2 (whether the steering angular velocity $\omega_s$ is positive or negative), and determine whether the current progress degree is in the first return phase II-1 or the second return phase II-2 (whether the steering angular velocity $\omega_s$ is positive or negative).

Next, in step S132, the controller 16 calculates an acceleration and deceleration determination value D. Here, the acceleration and deceleration determination value D is a specified sign value for determining the corrected longitudinal acceleration $A_{fr\_c}$ in an appropriate direction in accordance with the steering angle $\theta_s$ and the steering angular velocity $\omega_s$, which are indices of the current progress degree of the lane change. Specifically, the controller 16 calculates the acceleration and deceleration determination value D based on the following equation (1).

[Equation 1]

$$D = -\text{sgn}(\theta_s \times \omega_s) \qquad (1)$$

Here, "sgn ( )" is a sign function defined by the following equation (2).

[Equation 2]

$$\text{sgn}(x) = \begin{cases} 1 & : x > 0 \\ 0 & : x = 0 \\ -1 & : x < 0 \end{cases} \qquad (2)$$

In step S133, the controller 16 calculates a provisional acceleration $A_{pr}$ as a provisional value of the corrected longitudinal acceleration $A_{fr\_c}$ before the filter processing is performed. Specifically, the controller 16 determines the provisional acceleration $A_{pr}$ by multiplying the acceleration and deceleration determination value D calculated in step S132 by the set acceleration value |a| described in the first embodiment.

In step S134, the controller 16 performs high-pass filter processing on the determined provisional acceleration $A_{pre}$. The high-pass filter processing is executed for the purpose of setting the corrected longitudinal acceleration $A_{fr\_c}$ to "0" in a steady motion state of the vehicle α during the lane change. Here, the steady motion state in the present embodiment means a state in which an actual acceleration in the longitudinal direction or the lateral direction of the vehicle α is small enough to be able to determine that the change in the posture of the occupant O is not substantially caused. That is, in such a steady motion state, by executing the high-pass filter processing, the corrected longitudinal acceleration $A_{fr\_c}$ is not applied, and an acceleration and deceleration state according to an original driving force request of the vehicle α is realized.

In step S135, the controller 16 further performs low-pass filter processing on the provisional acceleration $A_{pre}$ after the high-pass filter processing. The low-pass filter processing is executed with the intention of making a change in an acceleration and deceleration signal (a value of the steering angular velocity $\omega_s$) equal to or less than a set value. That is, an object of the low-pass filter processing is to suppress a situation in which, when the steering angular velocity $\omega_s$ (corresponding to the acceleration jerk) changes for a short period of time due to some cause, the direction of the corrected longitudinal acceleration $A_{fr\_c}$ is switched for a short period of time, which affects a kinesthetic sense of the occupant O.

The controller 16 proceeds to the processing of step S140 using the corrected longitudinal acceleration $A_{fr\_c}$ set as described above.

An aspect of the corrected longitudinal acceleration $A_{fr\_c}$ set by the vehicle motion control method of the present embodiment described above will be described.

FIGS. 7A-7D are diagrams illustrating an aspect of the corrected longitudinal acceleration $A_{fr\_c}$ set by the vehicle motion control method of the present embodiment. In particular, FIGS. 7A-7D respectively show the lateral acceleration $A_{1a}$ and the lateral jerk $J_{1a}$, the corrected longitudinal acceleration $A_{fr\_c}$, the steering angle $\theta_s$ and the steering angular velocity $\omega_s$, and the acceleration and deceleration determination value D according to the progress of the lane change.

As illustrated, according to the vehicle motion control method of the present embodiment, in the movement phase I in which the steering angle $\theta_s$ (the lateral acceleration $A_{1a}$) is positive, in the first movement phase I-1 in which the steering angular velocity $\omega_s$ (the lateral jerk $J_{1a}$) is positive, the acceleration and deceleration determination value D is −1, and the corrected longitudinal acceleration $A_{fr\_c}$ is set to be negative (in a deceleration direction). On the other hand, in the second movement phase I-2 in which the steering angular velocity $\omega_s$ (the lateral jerk $J_{1a}$) is negative, the acceleration and deceleration determination value D is 1, and the corrected longitudinal acceleration $A_{fr\_c}$ is set to be positive (in an acceleration direction).

In the return phase II in which the steering angle $\theta_s$ (the lateral acceleration $A_{1a}$) is negative, in the first return phase II-1 in which the steering angular velocity $\omega_s$ (the lateral jerk $J_{1a}$) is positive, the acceleration and deceleration determination value D is −1, and the corrected longitudinal acceleration $A_{fr\_c}$ is set to be negative (in the deceleration direction). On the other hand, in the second return phase II-2 in which the steering angular velocity $\omega_s$ (the lateral jerk $J_{1a}$) is negative, the acceleration and deceleration determination value D is 1, and the corrected longitudinal acceleration $A_{fr\_c}$ is set to be positive (in the acceleration direction).

That is, in the present embodiment, during the lane change, in the first movement phase I-1 and the first return phase II-1 in which the absolute value of the steering angle $\theta_s$ increases ($\theta_s$ and $\omega_s$ have the same sign), the direction of the corrected longitudinal acceleration $A_{fr\_c}$ is set to the deceleration direction. In the second movement phase I-2 and the second return phase II-2 in which the absolute value of the steering angle $\theta_s$ decreases ($\theta_s$ and $\omega_s$ have mutually different signs), the direction of the corrected longitudinal acceleration $A_{fr\_c}$ is set to the acceleration direction.

Accordingly, it is possible to suppress a deviation (that is, an increase or decrease in the speed during the lane change due to the corrected longitudinal acceleration $A_{fr\_c}$) from the motion purpose originally required for the vehicle α before and after the lane change while generating an acceleration in the positive direction capable of suppressing a change in the roll attitude angle $\varphi_{ro}$ of the occupant O during the lane change. Therefore, it is possible to more reliably avoid the influence (an unintended speed change of the vehicle α) on the motion state originally required for the vehicle α while suppressing the change in the posture of the occupant O in the roll direction during the lane change.

According to a method of determining the direction of the corrected longitudinal acceleration $A_{fr\_c}$ based on a logic of FIG. 6 described above, as shown in FIG. 7B, regardless of the magnitude of the corrected longitudinal acceleration $A_{fr\_c}$ (the set acceleration value |a|), the increase or decrease (an integral value of the corrected longitudinal acceleration $A_{fr\_c}$ during the lane change) in the speed during the lane change due to the corrected longitudinal acceleration $A_{fr\_c}$ can be made substantially zero. Therefore, basically, regardless of the magnitude of the corrected longitudinal acceleration $A_{fr\_c}$, the influence on the motion state originally required for the vehicle α is suppressed. Therefore, only for the purpose of suppressing a change in the roll attitude angle $\varphi_{ro}$ of the occupant O, it is preferable to set the set acceleration value |a| to a value exceeding the sensory threshold $a_{th}$ during riding. However, also in the present embodiment, similarly to the first embodiment, it is most preferable to set the set acceleration value |a| to a value substantially equal to the sensory threshold $a_{th}$ during riding from the viewpoint of suppressing the occupant O from feeling a sense of discomfort due to the recognition of acceleration and deceleration based on the corrected longitudinal acceleration $A_{fr\_c}$.

Next, the operation and effect of the vehicle motion control method will be described by comparing Examples 1 and 2 based on the vehicle motion control method according to the present embodiment with a comparative example.

EXAMPLE 1

An inverted pendulum model was applied to a behavior of a change in a posture of the occupant O of the vehicle α including an electric vehicle, and a simulation was performed under the following conditions.

(i) Condition of Lane Change

The time of a lane change (the time from the start of the movement phase I to the completion of the return phase II) was set to 4 seconds, and the basic longitudinal acceleration $A_{fr\_tb}$ was set so that vehicle speeds before and after the lane change were substantially the same.

(ii) Corrected Longitudinal Acceleration $A_{fr\_c}$

A direction of the corrected longitudinal acceleration $A_{fr\_c}$ was set in accordance with the control logic described in FIG. 6. In particular, the basic longitudinal acceleration $A_{fr\_tb}$ in the movement phase I was set to be decelerated by a motor regeneration operation for about 0.5 seconds from the start of the first movement phase I-1, and to be accelerated by a motor power running operation in the second movement phase I-2. The basic longitudinal acceleration $A_{fr\_tb}$ in the return phase II was set to be decelerated by the motor regeneration operation for about one second from the start of the first return phase II-1, and to be accelerated by the motor power running operation in the second return phase II-2. Further, the magnitude of the corrected longitudinal acceleration $A_{fr\_c}$ (the set acceleration value |a|) was set to 0.5 [m/s$^2$] (about twice the sensory threshold $a_{th}$ during riding).

EXAMPLE 2

A simulation was performed under the same conditions as in Example 1 except that the set acceleration value |a| was set to 0.25 [m/s²] (substantially equal to the sensory threshold $a_{th}$ during riding).

COMPARATIVE EXAMPLE

A simulation was performed under the same conditions as in Example 1 or Example 2 without executing acceleration or deceleration in the longitudinal direction during a lane change (by setting the corrected longitudinal acceleration $A_{fr\_c}$ to 0).

Results and Discussion

Figure 8A:
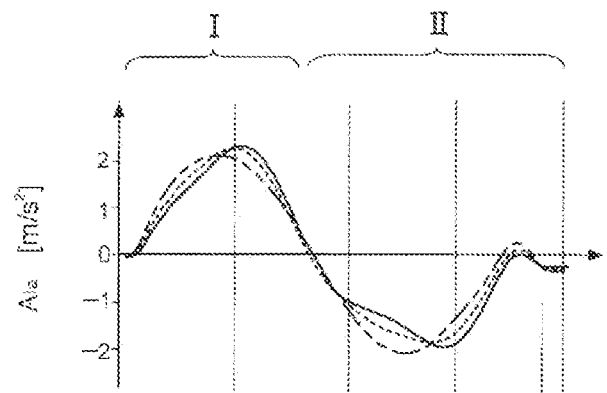
FIGS. 8A-C are diagrams illustrating results of simulations according to examples and a comparative example.
Figure 8B:
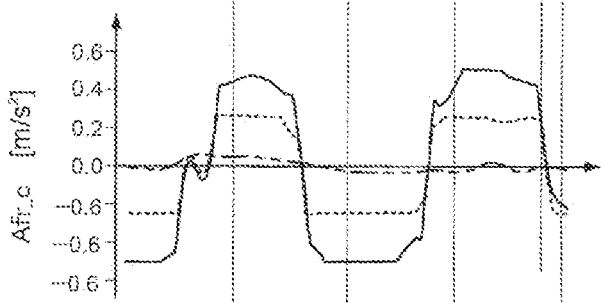
Figure 8C:
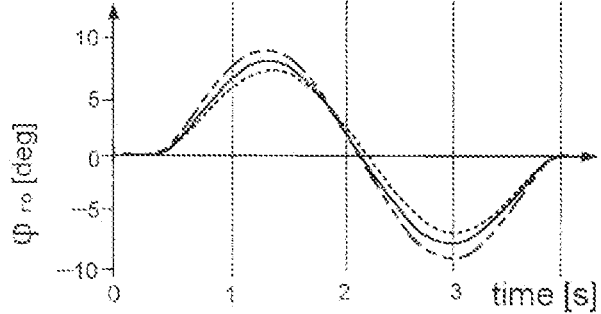

FIG. 8 shows results of simulations of Example 1, Example 2, and Comparative Example. In particular, FIGS. 8A-8C show a change in the lateral acceleration $A_{1a}$, a change in the corrected longitudinal acceleration $A_{fr\_c}$, and a change in the roll attitude angle $\varphi_{ro}$ (an inclination angle of an inverted pendulum), respectively.

As illustrated, it was found that in both Examples 1 and 2, the change in the roll attitude angle $\varphi_{ro}$ during the lane change was suppressed as compared with the comparative example. In Example 1 in which the magnitude of the corrected longitudinal acceleration $A_{fr\_c}$ (the set acceleration value |a|) was set to be larger than the sensory threshold $a_{th}$ during riding, an effect of suppressing the change in the roll attitude angle $\varphi_{ro}$ was slightly higher than Example 2 in which the set acceleration value |a| is set to be substantially equal to the sensory threshold $a_{th}$ during riding.

On the other hand, when the set acceleration value |a| is set to be larger than the sensory threshold $a_{th}$ during riding as in Example 1, the acceleration or deceleration of the vehicle α is recognized by the occupant O, and thus, it is assumed that the occupant O may feel a sense of discomfort. Therefore, from the viewpoint of reducing a possibility that the occupant O feels a sense of discomfort while exhibiting an effect of suppressing the change in the roll attitude angle $\varphi_{ro}$, it is most preferable to set the set acceleration value |a| to be substantially equal to the sensory threshold $a_{th}$ during riding as in Example 2. In particular, also in Example 2, an amplitude of the roll attitude angle $\varphi_{ro}$ is reduced by at least about 17% as compared with the case of the comparative example in which the corrected longitudinal acceleration $A_{fr\_c}$ is not applied.

According to the vehicle motion control method of the present embodiment having the configuration described above, the following operation and effect are exerted.

In the present embodiment, the vehicle transient motion is set as a lane change in which a change in the lateral acceleration $A_{1a}$ acting on the vehicle α corresponds to the progress degree. In a section (the second movement phase I-2 and the second return phase II-2) in which the absolute value of the lateral acceleration $A_{1a}$ during the lane change decreases, the direction of the corrected longitudinal acceleration $A_{fr\_c}$ is set to the positive direction along the acceleration direction of the vehicle α (FIGS. 7A-7D).

Accordingly, during the lane change as the vehicle transient motion over a certain period of time, it is possible to secure a section in which an inertial force (an inertial force directed toward the rear of the vehicle) that presses the occupant O toward the seat S acts. Therefore, the function of ensuring the friction between the occupant O and the seat S during the lane change can be exhibited, and the change in the posture of the occupant O can be suppressed.

In particular, in the present embodiment, in a section (the first movement phase I-1 and the first return phase II-1) in which the absolute value of the lateral acceleration $A_{1a}$ during the lane change increases, the direction of the corrected longitudinal acceleration $A_{fr\_c}$ is set to the negative direction along the deceleration direction of the vehicle α (FIGS. 7A-7D).

Accordingly, during the lane change, a constant deceleration section can be secured so as to cancel an increase in the vehicle speed caused by setting the corrected longitudinal acceleration $A_{fr\_c}$ in the positive direction as described above. Therefore, it is possible to suppress a change in the vehicle speed before and after the lane change, and thus it is possible to more reliably avoid the influence on the motion state originally required for the vehicle α while exhibiting an effect of suppressing the change in the posture of the occupant O.

In this way, in a section in which the absolute value of the lateral acceleration $A_{1a}$ increases (a section in which a strong sense of acceleration or deceleration occurs), it is presumed that an effect of causing the body of the occupant O to follow the vehicle motion is rather produced by setting the corrected longitudinal acceleration $A_{fr\_c}$ to be negative to apply an inertial force in a direction away from the seat S to the occupant O. Therefore, it is also expected that an effect of making it difficult for the occupant O to feel a deviation between the kinesthetic sense and the visual sense, which is a factor of motion sickness, is exhibited.

In the present embodiment, the steering angle $\theta_s$ of the vehicle α and the steering angular velocity $\omega_s$ as a time differential value of the steering angle $\theta_s$ are acquired as indications of the change in the lateral acceleration $A_{1a}$ during the lane change (steps S120 and S131). The direction of the corrected longitudinal acceleration $A_{fr\_c}$ during the lane change is set to the negative direction along the deceleration direction of the vehicle α when the product of the steering angle $\theta_s$ and the steering angular velocity $\omega_s$ is positive, and is set to the positive direction along the acceleration direction of the vehicle α when the product of the steering angle $\theta_s$ and the steering angular velocity $\omega_s$ is negative (Equation (1) and Equation (2)).

Accordingly, a calculation logic for setting an appropriate direction of the corrected longitudinal acceleration $A_{fr\_c}$ is realized in accordance with the change in the lateral acceleration $A_{1a}$ during the lane change (that is, the progress degree of the lane change) from the viewpoint of more reliably avoiding an influence on a required traveling state of the vehicle α before and after the lane change while maintaining the function of securing the friction between the occupant O and the seat S.

Instead of the steering angle $\theta_s$ and the steering angular velocity $\omega_s$, a detection value (hereinafter, also referred to as a "lateral acceleration detection value $A_{1a\_d}$") of the lateral acceleration $A_{1a}$ during the lane change and a lateral jerk $J_{1a}$ that is a time differential value of the lateral acceleration $A_{1a}$ may be acquired as parameters corresponding to the progress degree of the lane change.

More specifically, an aspect (see FIG. 7A) is also a disclosure matter of the specification of the present application, in which the lateral acceleration detection value $A_{1a\_d}$ and the lateral jerk $J_{1a}$ are acquired as indications of the change in the lateral acceleration $A_{1a}$ during the lane change, and the direction of the corrected longitudinal acceleration $A_{fr\_c}$ during the lane change is set to the negative direction along the deceleration direction of the vehicle α when the product of the lateral acceleration detection value $A_{1a\_d}$ and the lateral jerk $J_{1a}$ is positive, and is set to the positive direction along the acceleration direction of the vehicle α when the product of the lateral acceleration detection value $A_{1a\_d}$ and the lateral jerk $J_{1a}$ is negative.

Further, the steering angle $θ_s$ and the steering angular velocity $ω_s$ are included in a sensor signal that is generally provided as standard in an electronically controlled steering system. In a vehicle transient motion in a linear region (a region in which a tire lateral force can be proportionally approximated to a tire slip angle linearly) such as a lane change, it is theoretically known that the steering angle $θ_s$ and the steering angular velocity $ω_s$ substantially coincide with waveforms of the lateral acceleration $A_{1a}$ and the lateral jerk $J_{1a}$, respectively. The lateral jerk $J_{1a}$ needs to be calculated by differentiating the lateral acceleration detection value $A_{1a\_d}$ detected by the acceleration sensor, and since a large amount of noise is included, a contrivance is required to ensure the accuracy. Therefore, it is more preferable to use the steering angle $θ_s$ and the steering angular velocity $ω_s$ as the amount indicating the change in the lateral acceleration $A_{1a}$ during the lane change assumed in the present application.

Embodiments of the present invention have been described above, but the above embodiments and modifications are merely a part of application examples of the present invention, and do not mean that the technical scope of the present invention is limited to the specific configurations of the above embodiments.

For example, as described above, the vehicle α to which the vehicle motion control method of each of the above embodiments is applied may be an electric vehicle or a vehicle driven by an engine. However, the vehicle motion control method of each of the above embodiments can be executed with higher accuracy by being applied to an electric vehicle in which acceleration and deceleration can be performed by electric control with higher responsiveness such as power running control and regenerative control of a motor.

In the above embodiments, an example in which a friction brake and a regenerative brake are used as the traveling actuator 14 that implements deceleration of the vehicle α in the longitudinal direction has been described. However, the deceleration of the vehicle α may be implemented by a mechanical structure (such as a structure in which internal resistance of a drive system is variable).

Further, in the second embodiment, an example in which the corrected longitudinal acceleration $A_{fr\_c}$ is set so that the change in the vehicle speed is substantially zero before and after the lane change has been described. However, the present invention is not limited thereto, and a control mode (control including, at least in part, a section in which the corrected longitudinal acceleration $A_{fr\_c}$ is set to 0 or less during the lane change) may be adopted in which at least an increase in the vehicle speed is suppressed compared to a case where the acceleration in the positive direction is continuously applied during the lane change, although the increase or decrease in the vehicle speed is slightly performed before and after the lane change.

In the above embodiments, an example is assumed in which the controller 16 automatically executes an operation of the steering angle $θ_s$ of the vehicle α during the lane change. However, instead of this, the control of the above embodiments may be applied to the vehicle α in which the steering angle $θ_s$ during the lane change is manually adjusted by an operation on the steering of a driver. On the other hand, assuming a configuration in which the adjustment of the steering angle $θ_s$ during the lane change is automatically executed, a feedback element (detection of the steering angle $θ_s$) for determining the corrected longitudinal acceleration $A_{fr\_c}$ in the control of the above embodiments may be omitted by adopting a configuration in which a change in the steering angle $θ_s$ according to the progress degree of the lane change is grasped in advance. Accordingly, the control responsiveness can be further improved.

Further, in the above embodiments, an example in which the vehicle transient motion in which the acceleration in the lateral direction occurs in the vehicle α is a lane change has been described. However, also in the case of the vehicle transient motion other than the lane change, the vehicle motion control method of each of the above embodiments can be applied while slightly changing the vehicle motion control method in a scene in which the acceleration in the lateral direction that promotes the change in the posture of the occupant O in the roll direction occurs. For example, when the turning of the vehicle α is detected, not limited to the lane change, a configuration in which the corrected longitudinal acceleration $A_{fr\_c}$ is set to a constant value in the positive direction.

In the above embodiments and modifications, an example in which the steering angle $θ_s$ and the steering angular velocity $ω_s$ or the lateral acceleration detection value $A_{1a\_d}$ and the lateral jerk $J_{1a}$ are used as the parameters indicating the progress degree of the lane change has been described. However, instead of these, a parameter indicating the progress degree of the lane change may be determined based on other physical quantities, external information, or the like.

Furthermore, the numerical range of the sensory threshold $a_{th}$ during riding assumed in each of the above embodiments is not necessarily limited to the above specific value (about 0.2 to 0.3 [m/s²]). In particular, if the sensory threshold $a_{th}$ during riding is a value exceeding the standard sensory threshold (about 0.05 to about 0.1 [m/s²]), the sensory threshold $a_{th}$ during riding can be set to an appropriate value in consideration of various factors (specifications of the vehicle α, an assumed traveling environment, and the like) within a range in which an effect of preventing the occupant O from recognizing an acceleration or deceleration state can be exhibited.

A vehicle motion control program for allowing the controller 16, which is a computer, to execute the vehicle motion control method described in the above embodiments, and a storage medium that stores the vehicle motion control program are also included in the scope of the matters described in the specification at the time of filing of the present application.

The invention claimed is:

1. A vehicle motion control method for controlling a motion state of a vehicle during a vehicle transient motion in which an acceleration in a lateral direction is generated in the vehicle, the vehicle motion control method comprising:
    setting a corrected longitudinal acceleration for correcting a basic longitudinal acceleration determined in accordance with a required driving force for traveling of the vehicle;
    determining a target longitudinal acceleration from the basic longitudinal acceleration and the corrected longitudinal acceleration, and operating a travel actuator of the vehicle based on the target longitudinal acceleration, wherein a direction and a magnitude of the corrected longitudinal acceleration are determined from a viewpoint of suppressing a change in a posture of an occupant of the vehicle in a roll direction, and the direction of the corrected longitudinal acceleration is set to a positive direction along an advancing direction of the vehicle in at least a part of a section of the vehicle transient motion; and setting the magnitude of the corrected longitudinal acceleration using a sensory threshold during riding that is obtained by correcting a sensory threshold with respect to a translational acceleration of a person based on a traveling environment of the vehicle.

2. The A vehicle motion control method for controlling a motion state of a vehicle during a vehicle transient motion in which an acceleration in a lateral direction is generated in the vehicle, the vehicle motion control method comprising:

setting a corrected longitudinal acceleration for correcting a basic longitudinal acceleration determined in accordance with a required driving force for traveling of the vehicle;

determining a target longitudinal acceleration from the basic longitudinal acceleration and the corrected longitudinal acceleration, and operating a travel actuator of the vehicle based on the target longitudinal acceleration, wherein a direction and a magnitude of the corrected longitudinal acceleration are determined from a viewpoint of suppressing a change in a posture of an occupant of the vehicle in a roll direction, and the direction of the corrected longitudinal acceleration is set to a positive direction along an advancing direction of the vehicle in at least a part of a section of the vehicle transient motion;

setting the vehicle transient motion as a lane change in which a change in a lateral acceleration acting on the vehicle corresponds to a progress degree; and setting a direction of the corrected longitudinal acceleration to a positive direction along an acceleration direction of the vehicle in a section in which an absolute value of the lateral acceleration during the lane change decreases.

3. The vehicle motion control method according to claim 2, further comprising:

acquiring a steering angle of the vehicle and a steering angular velocity as a time differential value of the steering angle as indications of a change in the lateral acceleration during the lane change; and setting the direction of the corrected longitudinal acceleration during the lane change to a negative direction along a deceleration direction of the vehicle when a product of the steering angle and the steering angular velocity is positive, and to the positive direction along the acceleration direction of the vehicle when the product of the steering angle and the steering angular velocity is negative.

4. The vehicle motion control method according to claim 2, further comprising:

acquiring a lateral acceleration detection value of the vehicle and a lateral jerk as a time differential value of the lateral acceleration detection value as indications of a change in the lateral acceleration during the lane change; and setting the direction of the corrected longitudinal acceleration during the lane change to a negative direction along a deceleration direction of the vehicle when a product of the lateral acceleration detection value and the lateral jerk is positive, and to the positive direction along the acceleration direction of the vehicle when the product of the lateral acceleration detection value and the lateral jerk is negative.

5. A vehicle motion control method for controlling a motion state of a vehicle during a vehicle transient motion in which an acceleration in a lateral direction is generated in the vehicle, the vehicle motion control method comprising:

setting a corrected longitudinal acceleration for correcting a basic longitudinal acceleration determined in accordance with a required driving force for traveling of the vehicle;

determining a target longitudinal acceleration from the basic longitudinal acceleration and the corrected longitudinal acceleration, and operating a travel actuator of the vehicle based on the target longitudinal acceleration, wherein a direction and a magnitude of the corrected longitudinal acceleration are determined from a viewpoint of suppressing a change in a posture of an occupant of the vehicle in a roll direction, and the direction of the corrected longitudinal acceleration is set to a positive direction along an advancing direction of the vehicle in at least a part of a section of the vehicle transient motion;

setting the vehicle transient motion as a lane change in which a change in a lateral acceleration acting on the vehicle corresponds to a progress degree; and setting a direction of the corrected longitudinal acceleration to a negative direction along a deceleration direction of the vehicle in a section in which an absolute value of the lateral acceleration during the lane change increases.

6. A vehicle motion control device programmed to control a motion state of a vehicle during a vehicle transient motion in which an acceleration in a lateral direction is generated in the vehicle, wherein the vehicle motion control device is programmed to:

set a corrected longitudinal acceleration for correcting a basic longitudinal acceleration determined in accordance with a required driving force for traveling of the vehicle;

determine a target longitudinal acceleration from the basic longitudinal acceleration and the corrected longitudinal acceleration, and operate a travel actuator of the vehicle based on the target longitudinal acceleration, wherein a direction and a magnitude of the corrected longitudinal acceleration are determined from a viewpoint of suppressing a change in a posture of an occupant of the vehicle in a roll direction, and the direction of the corrected longitudinal acceleration is set to a positive direction along an advancing direction of the vehicle in at least a part of a section of the vehicle transient motion;

set the vehicle transient motion as a lane change in which a change in a lateral acceleration acting on the vehicle corresponds to a progress degree; and set a direction of the corrected longitudinal acceleration to a positive direction along an acceleration direction of the vehicle in a section in which an absolute value of the lateral acceleration during the lane change decreases.

7. A vehicle motion control device programmed to control a motion state of a vehicle during a vehicle transient motion in which an acceleration in a lateral direction is generated in the vehicle, wherein the vehicle motion control device is programmed to:

set a corrected longitudinal acceleration for correcting a basic longitudinal acceleration determined in accordance with a required driving force for traveling of the vehicle; and determine a target longitudinal acceleration from the basic longitudinal acceleration and the corrected longitudinal acceleration, and operate a travel actuator of the vehicle based on the target longitudinal acceleration, wherein a direction and a magnitude of the corrected longitudinal acceleration are determined from a viewpoint of suppressing a change in a posture of an occupant of the vehicle in a roll direction, and wherein the magnitude of the corrected longitudinal acceleration is set using a sensory threshold during riding that is obtained by correcting a sensory threshold with respect to a translational acceleration of a person based on a traveling environment of the vehicle.

8. A vehicle motion control device programmed to control a motion state of a vehicle during a vehicle transient motion in which an acceleration in a lateral direction is generated in the vehicle, wherein the vehicle motion control device is programmed to:

set a corrected longitudinal acceleration for correcting a basic longitudinal acceleration determined in accordance with a required driving force for traveling of the vehicle;

determine a target longitudinal acceleration from the basic longitudinal acceleration and the corrected longitudinal acceleration, and operating a travel actuator of the vehicle based on the target longitudinal acceleration, wherein a direction and a magnitude of the corrected longitudinal acceleration are determined from a viewpoint of suppressing a change in a posture of an occupant of the vehicle in a roll direction, and the direction of the corrected longitudinal acceleration is set to a positive direction along an advancing direction of the vehicle in at least a part of a section of the vehicle transient motion;

set the vehicle transient motion as a lane change in which a change in a lateral acceleration acting on the vehicle corresponds to a progress degree; and set a direction of the corrected longitudinal acceleration to a negative direction along a deceleration direction of the vehicle in a section in which an absolute value of the lateral acceleration during the lane change increases.

\* \* \* \* \*